US010628902B2

(12) United States Patent
Asad et al.

(10) Patent No.: US 10,628,902 B2
(45) Date of Patent: Apr. 21, 2020

(54) DEPLOYABLE KIOSK FOR PROVIDING DATA INPUT AND VERIFICATION

(71) Applicant: Q Link Wireless, LLC, Dania Beach, FL (US)

(72) Inventors: Issa Asad, Dania Beach, FL (US); Denise Grace, Dania Beach, FL (US); Brian Hartigan, Dania Beach, FL (US); Erik Miller, Dania Beach, FL (US); Ron Rechtman, Dania Beach, FL (US); Luis Rodriguez, Dania Beach, FL (US); Paola Rojas, Dania Beach, FL (US); Roi Sadeh, Dania Beach, FL (US)

(73) Assignee: Q Link Wireless, LLC, Dania Beach, FL (US)

(*) Notice: Subject to any disclaimer, the term of this patent is extended or adjusted under 35 U.S.C. 154(b) by 668 days.

(21) Appl. No.: 15/287,820

(22) Filed: Oct. 7, 2016

(65) Prior Publication Data
US 2017/0103489 A1 Apr. 13, 2017

Related U.S. Application Data

(60) Provisional application No. 62/238,254, filed on Oct. 7, 2015.

(51) Int. Cl.
G06Q 50/26 (2012.01)
H04L 29/08 (2006.01)
(Continued)

(52) U.S. Cl.
CPC ....... G06Q 50/265 (2013.01); G06K 9/00154 (2013.01); H04L 63/08 (2013.01);
(Continued)

(58) Field of Classification Search
CPC .................. G06Q 50/265; H04L 63/107
(Continued)

(56) References Cited

U.S. PATENT DOCUMENTS 7,735,125 B1* 6/2010 Alvarez ............... G06Q 20/027
705/67
2008/0077422 A1* 3/2008 Dooley ................. G06Q 30/02
705/26.1
(Continued)

OTHER PUBLICATIONS

DigitalSignageToday.com: Best Practices for Deploying an Interactive Outdoor Kiosk. 2017. Chatham: Newstex. (Year: 2017).*

Primary Examiner — Michael Misiaszek
Assistant Examiner — Latasha D Ramphal
(74) Attorney, Agent, or Firm — Maier & Maier, PLLC

(57) ABSTRACT

According to exemplary embodiments, a secure kiosk for receiving, transmitted, securing, and verifying data may be shown and described. For example, the kiosk may be fully automated. The kiosk may include a display, a tablet computer, a card reader, a printer, and a network link. For example, a kiosk may be provided and may be fully automated. The kiosk may accept data inputs in a variety of manners. The inputted data may then be transmitted, in real time, to a first server, where the information can be displayed and stored. Additionally, the information, at predetermined times, may be transmitted to a number of other servers which may receive, compare, and validate information. Further, a hierarchical data transmission system may be utilized such that, when information is verified or indicated as unverified at any of the other servers, instructions may be sent to at least the first server and the kiosk.

20 Claims, 6 Drawing Sheets

(51) Int. Cl.
*H04L 29/06* (2006.01)
*G06K 9/00* (2006.01)
(52) U.S. Cl.
CPC ............ *H04L 63/107* (2013.01); *H04L 67/18* (2013.01); *G06K 2209/01* (2013.01)
(58) Field of Classification Search
USPC .................................................... 705/26–27
See application file for complete search history.

(56) References Cited

U.S. PATENT DOCUMENTS

2008/0255876 A1\* 10/2008 Larsen ................. G06Q 10/109
  705/2
2012/0054642 A1\* 3/2012 Balsiger ................. G06Q 10/10
  715/752

\* cited by examiner

400

DEPLOYABLE KIOSK FOR PROVIDING DATA INPUT AND VERIFICATION

BACKGROUND

Kiosks are deployed in different environments and enjoy a variety of functions. Common modern kiosks are unmanned or automated and provide a user with some form of interface in order to receive or supply information and products. However, such kiosks are limited with respect to the information or products they can supply based on location, communication capabilities, and other physical limitations.

Information related to the acquisition, appropriation, or purchasing of goods and services is currently handled in a variety of manners. Typically, information is provided in a human-to-human setting, a human-to-machine setting or some combination thereof. The desired result is a proper conveyance of information in exchange for the desired goods or services. This information might be, for example, payment information, or may be an indication that the recipient is entitled or eligible to receive the goods or services in question.

However, in many environments, the information provided in exchange for the goods or services must be verified in order to ensure that the goods or services can be properly provided. In such situations, there are numerous avenues that can be taken to fraudulently pass information to a human or machine in order to fraudulently obtain the desired goods or services. The information provided in these interactions is typically difficult or impossible to verify properly and in a timely fashion by a human or by a human working in conjunction with a machine. Further, it is typically impossible to track the purveyors of fraudulent information or the results of the fraud.

In many instances, it can be extremely damaging to a purveyor of goods and services to have these goods and services be fraudulently obtained. This can be particularly true when the goods and services in question have a restricted level of eligibility—for example, if the goods and services in question are only intended to be available to particular applicants. In many instances, if an applicant to receive restricted goods and services misrepresents themselves as eligible to receive the goods and services when they actually are not eligible, there can be adverse consequences for the purveyor. In the best-case scenario, the purveyor of goods and services will often be out the cost of providing the goods and services. In other instances, like when the goods and services are limited in number and have been pre-ordered by prospective buyers, the purveyor may open themselves up to civil legal liability when they do not have enough goods or services available to satisfy all of their customers. In other instances, like when the goods and services are restricted from purchase by a certain class of persons (for example, by a prohibition on felons purchasing firearms) the purveyor may open themselves up to criminal liability. In still other instances, like when there is a government subsidy for providing the goods and services, the purveyor may be fined for improperly awarding the goods and services to be awarded; for example, a number of mobile phone carriers have been fined for mistakenly awarding subsidized phones to ineligible recipients under the federal government's Lifeline program.

Despite the damage that fraud can do to a purveyor of goods and services, it can still be highly pervasive. Continuing with the Lifeline program example, according to one report, 41 percent of the 6 million subscribers enrolled in the federal government's Lifeline program could not produce documents that could verify their eligibility for the program, and many did not even bother to respond to FCC requests to produce eligibility documentation. This occurred despite the fact that, under the terms of the Lifeline program, mobile phone carriers could be fined for a significant amount of money (more than they received in subsidies) for each fraudulently-registered phone.

There are many reasons why it may be difficult for a purveyor of goods and services to limit the acquisition of restricted goods or services to just those applicants who are actually eligible to receive them. The first is that fraud may be hard to catch. For example, in the Lifeline program example above, before the program guidelines were strengthened, subscribers could verify that they were eligible to receive a phone merely signing their names to a form. The signatures of people eligible for the program could not be adequately verified, and as a result many of these signatures were fraudulent; for example, it was common for Lifeline plans to be registered to people who had not requested them, or Lifeline landlines to be registered to vacant houses. Even after program guidelines were strengthened in order to try to stem the amount of fraud taking place, it was still relatively easy to fraudulently obtain a Lifeline phone. For example, an additional step required by the new program guidelines was to require that an applicant produce additional documentation or proof of identity, such as a food stamp card; however, in many cases, fake food stamp cards were able to slip through the cracks just as the fake signatures had.

A second reason why fraud may be hard to catch is because of the presence of a human element. The interests of vendors of the good or service, or the interests of other parties in the chain, may not be aligned with the purveyor's interest in preventing fraud. For example, again referring to the example of the Lifeline program, a reason why fraud was difficult to detect was that the vendors of the Lifeline phones were incentivized to process as many applications as possible, and were not punished for allowing through fraudulent applications or otherwise incentivized against doing so. Because vendors were incentivized to process as many applications as possible (and were often even paid by the application), many allowed through even obvious fraud, such as food stamp cards stamped with the words "training card," or food stamp cards that had clearly been printed from internet files. Some vendors even participated in the fraud; for example, according to one news report, when a reporter attempted to submit an application without a food stamp card or other proof of eligibility, the vendor supplied a food stamp card that belonged to another citizen.

Even well-meaning vendors who desired to prevent fraud found themselves unable to do so. A vendor of mobile phones under the Lifeline program who is working on the street and without assistance has very little ability to screen out forged signatures, especially when they have nothing to compare a proffered signature to and no expertise in handwriting analysis. The same street vendor likely also has very limited ability to screen out fraudulent documentation if any is presented to them by an applicant for a good or service, especially if the street vendor is tasked with providing goods and services to an applicant in a specific time window and cannot perform an extensive background check on any applicant. Because of this, many fraudulent signatures or fraudulent articles of documentation were accepted as part of the program.

SUMMARY

According to exemplary embodiments, a secure kiosk for receiving, transmitted, securing, and verifying data may be shown and described. According to an exemplary embodiment, the kiosk may be fully automated. The kiosk may include a display, a tablet computer, a card reader, a printer, and a network link.

The kiosk may accept data inputs in a variety of manners. In an exemplary embodiment, the kiosk may be configured to identify a user from certain identifying information proffered by a user. For example, the kiosk may capture identity information of a user from a driver's license or other identification card of a user, or may include a card reader having a parsing algorithm configured to capture identity information from a credit card or other payment card of a user.

The inputted data may then be transmitted, in real time, to a first server, where the information can be displayed and stored. Additionally, the information, at predetermined times, may be transmitted to a number of other servers which may receive, compare, and validate information. Further, a hierarchical data transmission system may be utilized such that, when information is verified or indicated as unverified at any of the other servers, instructions may be sent to at least the first server and the kiosk. Such instructions may be to, for example, permit or deny a user access into a limited-eligibility program, such as a subsidized government aid program intended for indigent persons, or may be used to permit or deny a user access to particular equipment, such as a subsidized cellular phone provided as part of a government aid program.

Additionally, various other components of the method and system may be described herein. Such components can include various hardware and software elements that provide for the input of information or data, the storage of information or data, the comparison of information or data, the transmission of information or data, the display of information or data, and other outputs or transactions of information or data.

BRIEF DESCRIPTION OF THE DRAWINGS

Advantages of embodiments of the present invention may be apparent from the following detailed description of the exemplary embodiments. The following detailed description should be considered in conjunction with the accompanying Figures in which.

DETAILED DESCRIPTION

Aspects of the present invention are disclosed in the following description and related Figures directed to specific embodiments of the invention. Those skilled in the art may recognize that alternate embodiments may be devised without departing from the spirit or the scope of the claims. Additionally, well-known elements of exemplary embodiments of the invention may not be described in detail or may be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein may be performed by specific circuits (e.g., application specific integrated circuits (ASICs)) and/or by program instructions executed by at least one processor. Additionally, the sequence of actions described herein may be embodied entirely in a form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Generally referring to the figures and specification, various exemplary embodiments of a system and method for presenting, storing, transmitting, and verifying information may be described herein.

In one exemplary embodiment, and still generally referring to the figures, a kiosk may be constructed that can allow for the input of data. The kiosk may include a display, data entry, and output capabilities. For example, the kiosk may include a tablet with various display capabilities, as well as manners of inputting data. The display on the kiosk may provide any of a variety of information. For example, the display can show advertisement or marketing information, may show requests for data input at certain times and may show outputs of data processed internally or received from remote locations at certain times.

Figure 1:
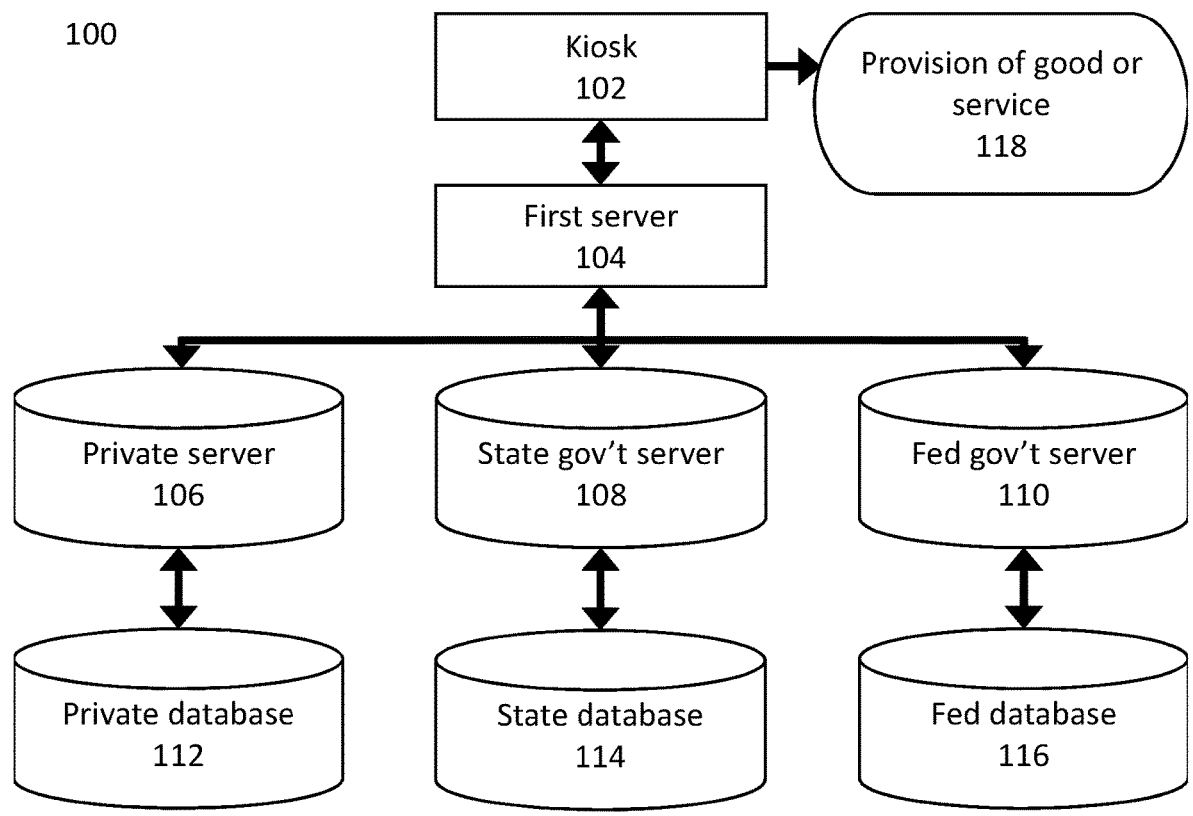
FIG. 1 depicts an exemplary system diagram for a system for receiving, transmitting, securing, and verifying data.

FIG. 1 depicts an exemplary system diagram for a system for receiving, transmitting, securing, and verifying data. According to an exemplary embodiment, a kiosk 102 may be connected to any number of remotely located servers 104, 106, 108, 110. For example, according to an exemplary embodiment, a kiosk 102 may be connected to a first server 104 that acts as a hub or gatekeeper, and the first server 104 may then be connected to one or more other servers, such as a private server 106, a state government server 108, a federal government server 110, multiple private servers 106, state government servers 108, or federal government servers 110, or any other servers, as desired. The remotely located servers 106, 108, 110 may be associated with any of a variety of public or private entities and may house, for example, any number of secure databases 112, 114, 116. Connections between the kiosk 102 and the servers 104, 106, 108, 110 may be made using any known or desired data link or connection and may be secure and encrypted, for example with a secure socket layer (SSL) connection, if desired. According to another exemplary embodiment, the kiosk 102 may, instead of directly communicating with one or more servers 104, 106, 108, 110, may communicate with one or more server APIs, which may then authenticate and communicate with one or more secure databases 112, 114, 116, as desired.

A number of the databases 112, 114, 116 to which the kiosk 102 is connected may securely house information about any of a variety of people. Such information may be used to verify the identity and/or other qualities of individuals using the kiosk 102 who may be requesting or attempting to acquire certain goods or services.

In a further exemplary embodiment, a user of the kiosk 102 may be prompted to enter data in order to determine if the user is eligible for certain goods or services. The goods or services may be, for example, access to a Lifeline mobile phone. Kiosk 102 may then be configured to designate the user as being eligible to receive the goods or services from another party or location 118, for example by printing a receipt or an eligibility code for the user that the user can show to claim a good or service. In an alternative exemplary embodiment, kiosk 102 may dispense the good or service directly 118. According to an exemplary embodiment, kiosks 102 may also be used for any other similar purpose.

According to an exemplary embodiment, the user may input a variety of information, such as their name, address, and all or part of their social security number, or some other identification information, into the kiosk 102. This information may be shared and, when desired, displayed in real time on a display associated with a first server 104. The information may also be stored in real time or after a submission or other form of completion of information entry.

Figure 2:
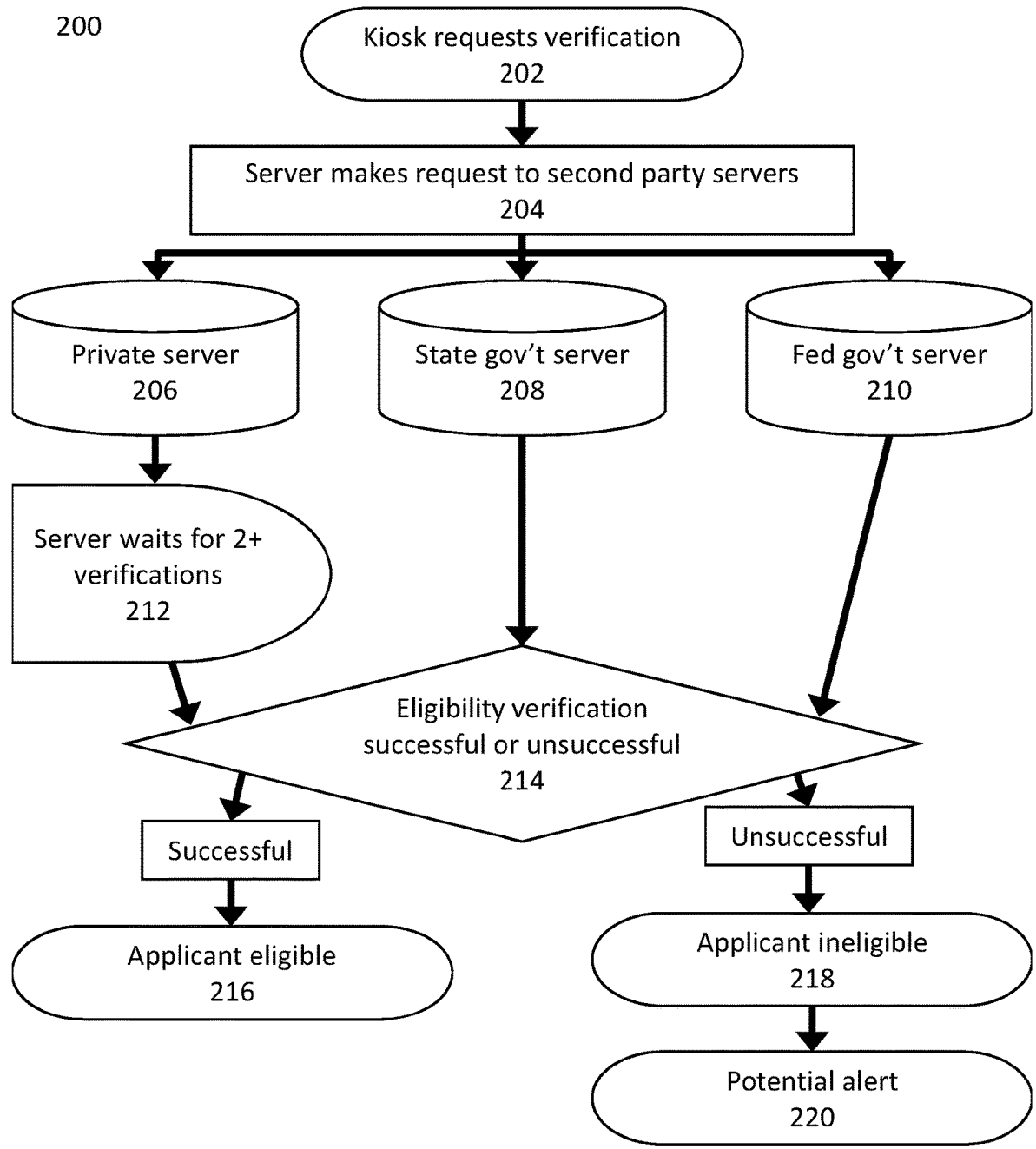
FIG. 2 depicts an exemplary process flow diagram for verifying information entered by an applicant.

Turning now to exemplary FIG. 2, FIG. 2 depicts an exemplary process flow diagram for verifying information entered by an applicant. According to an exemplary embodiment, and as depicted in FIG. 2, after the information is entered, it may be transmitted directly or indirectly to any number of second party servers 204. According to an exemplary embodiment, a kiosk may request verification 202 from a first server, and the first server may then request the information 204 from second-party servers 206, 208, 210. According to another exemplary embodiment, the first server may directly make a request without verification being requested from a kiosk. According to an exemplary embodiment, the second party servers 206, 208, 210 may be any combination of public and private servers which may house or otherwise be securely associated with information verification data. Such servers can include, but are not limited to servers associated with state tax record and identity information 208, federal government servers (such as FCC) associated with records and identities 210, and private entity servers (such as Lexis Nexis) 206 that house identity verification information or otherwise are capable of verifying an individual's identity. Additionally, each or any of these servers 206, 208, 210 and the information they are associated with may also verify other information about a user. This information can include whether they are qualified or enrolled in certain income-related programs, such as SNAP, food stamps, welfare, and the like, as well as permanent address information and any other information, such as contact information for the individual.

As discussed above, verification information can be sent from the kiosk 202 to any of a variety of servers 206, 208, 210 for verification of information. Each server 206, 208, 210, along with each associated database and any processing capabilities, may compare the provided information with appropriate verification information stored therein. Upon completion of the verification of the information 214, the server 206, 208, 210 may immediately transmit a response to both the kiosk and the first server. The response may indicate that the information was properly verified or that the information could not be or is not verified. Based on the responses sent from the servers 206, 208, 210, a first server may make a determination 214 about whether the applicant is eligible 216 or ineligible 218 to receive the good or service. Potentially, if fraud is detected and the applicant is determined to be ineligible 218 for that reason, an alert 220 may also be generated.

According to an exemplary embodiment, when a message is received at the first server and the kiosk that the information is verified, a message may be sent from one or both of the kiosk and first server to any of the variety of servers which has not yet returned a verification message or response. This message can indicate that such a query is no longer necessary or desired from these other databases and that any further queries or processing may be suspended, as well as no further transmissions being necessary for that inquiry from the other servers to the kiosk or first server. In other exemplary embodiments, it may be appreciated that there is a hierarchy of verifications from the different servers 206, 208, 210 and that appropriate or desired verification messages may be sent based on a ranking or desired ordering of the servers. For example, if a private server 206 and associated database return a verification of information, it may be desired to receive a verification from a state server 208 or federal server 210. Alternatively, if a state server 208 or federal server 210 verifies the information, it may not be desired or necessary to receive any verification from a private server and associated database. Alternatively, different weights or values may be attributed to different servers, such as public servers 208, 210 or private servers 206, or based on servers having a higher estimated reliability. For example, according to an exemplary embodiment, a given state server 208 or federal server 210 may have a weight of 1, indicating that only the verification response from that server is needed to provide a verification, while a given private server 106 may have a weight of 0.5, indicating that if a verification response is provided by that server, an additional verification may be necessary or may be solicited. According to such an exemplary embodiment, a first server may wait for two or more successful verifications 212 from a private server 206 or other server having a lower weight before a given applicant is considered to be eligible for a good or service 214. When a sufficient number of verifications, for example one or more verifications, have been received, the first server may then determine the eligibility of the applicant 214 and may determine that the applicant is eligible 216 or ineligible 218.

Figure 3:
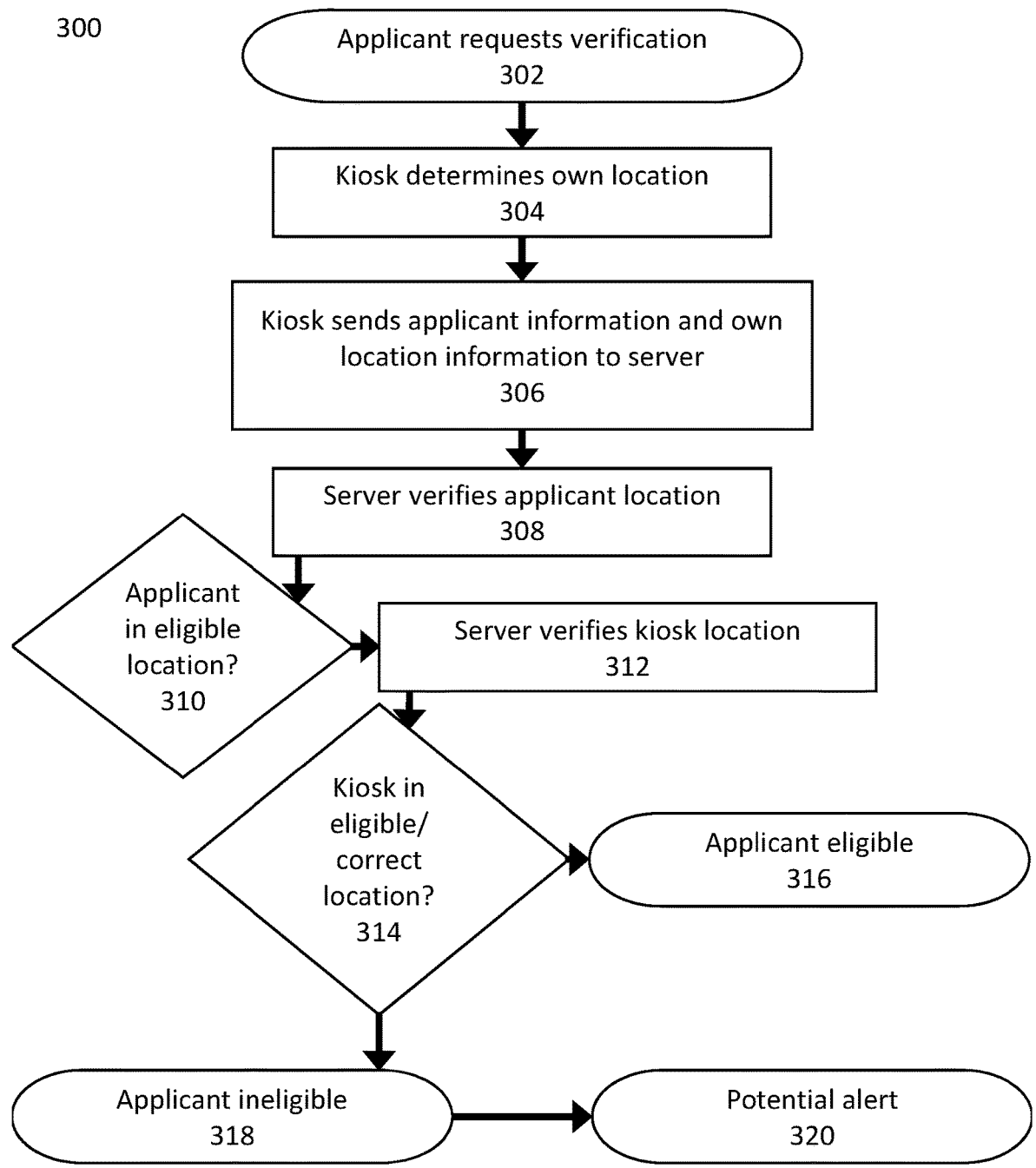
FIG. 3 depicts an exemplary process flow diagram for verifying location information.

Turning now to exemplary FIG. 3, FIG. 3 depicts an exemplary process flow diagram for verifying location information. In still another exemplary embodiment, the information to be verified by a kiosk and/or server may include location information, such that when an applicant requests verification 302 at a kiosk, the kiosk may send the applicant's location and other information, as well as its own location information 304, to a first server 306. This may be done if, for example, a user of the kiosk may or may not be eligible for products or services based on the geographic location of the user (e.g. their home address) or the kiosk (e.g. there is not appropriate mobile phone coverage in a selected or desired area). In such circumstances, upon entry of information into the kiosk, the location of the kiosk may be obtained by the kiosk 304 and verified 312, for example using GPS coordinates, WiFi information, or cell tower information. Additionally, the input location of the user 302, as well as any other address information of the user, may also be verified 308. If such information is acceptable and within an area where goods or services may be provided, further steps may be taken by the kiosk and/or user 310, 314, or the user may be determined to be eligible 316. If the user or kiosk is determined to be outside of an appropriate area where goods or services may be provided 310, 314, the user may be determined to be ineligible 318, and an alert 320 may be generated and shown to the user, displayed and/or stored by the kiosk and the information may also be sent back to the first server. In some circumstances the kiosk may be or may have been moved to an undesired location, or some other fraud may have been attempted, so a record of the transaction or attempted transaction may be stored in these circumstances.

Additionally, if it is determined that the geographic information related to the user or the kiosk (such as an operating area of a mobile phone service) is inappropriate, a user may be able to provide alternative address information or otherwise have their location verified, for example by having the kiosk provide a list of appropriate or correct addresses that may resolve issues with a user's address being improperly entered or other such issues.

In another exemplary embodiment, a kiosk may have one or more motion detectors built in. In such embodiments, a kiosk may display an advertisement or other marketing materials upon detection of a possible user which may prompt the user for some type of action or activity. Alternatively, a kiosk may switch from a first advertisement or video data to a second set of video data upon detection of motion nearby. In some other exemplary embodiments, a kiosk may be in a power conserving mode until nearby motion is detected. In other examples, a kiosk may be muted until motion is detected and may provide audio data after detecting motion.

In another exemplary embodiment, a kiosk may have any of a variety of image or video capture capabilities, for example one or more cameras, embedded therein. A camera may be used to record, as a photo, a series of photos, or video, any transaction occurring on the kiosk. The camera may also include optical character recognition (OCR) capabilities to capture and automatically input data from any of a variety of sources, such as from a driver's license or other government document. The camera may be able to determine the location of desired data on documents of any shape or format, for example driver's licenses from different states. Additionally, upon the presentation of certain documents, such as a driver's license, the kiosk may automatically capture the image of the face of the user with the driver's license and the image may be stored. This can provide a further level of identity verification of a user and also can be stored as a record of a transaction or evidence of any fraud that has been perpetrated. Additionally, upon display of a document such as a driver's license, recognized and desired information may be automatically populated on an appropriate form for the user to view and affirm. Finally, it is envisioned that any payment information provided via the card reader, or any other manner associated with the kiosk, may be secure and may be entered and utilized in a secure fashion.

In another exemplary embodiment, any form or transaction that takes place on the kiosk may be digitally signed by a user. For example, the user can provide a signature with an electronic pen system, stylus, or the like. In some embodiments, the signature may be compared to a signature on another document, such as a driver's license, to provide further authentication evidence.

In another exemplary embodiment, the kiosk may have any of a variety of output elements. As described above, a display may be used to output any desired data. Additionally, a printer may be coupled to the kiosk to provide a printout of any desired information following a transaction on the kiosk. This can include, for example, a session ID number, an authorization code, proof of submitted data, follow-up contact information, reasons for refusal of goods or services, and the like.

In still another exemplary embodiment, data may be input into the kiosk in any of a variety of fashions. For example, as discussed herein, a touchpad on a tablet may be used to input information. Additionally any combination of a camera and video camera may be used. Further, a credit card reader may be implemented with the kiosk. In one example, a credit card reader, such as a magnetic card reader or chip-based card reader, may be coupled with the kiosk in such a fashion that a headphone jack is repurposed as a data port to allow for the entry of credit card information obtained from the credit card reader. The repurposed headphone jack may provide for power to the credit card reader and provide a data transmission link between the credit card reader and the tablet. It may further be appreciated that such a card reader may be used to capture information from an identification card, such as a driver's license. Additionally, the card reader and tablet may include a parsing algorithm that allows for the acquisition of data from a credit card or identification card and to load the information in desired locations. For example, according to an exemplary embodiment wherein a credit card has a magnetic strip encoding information in a track 1 format, the card reader and tablet may parse the data acquired from the credit card, acquire a user's name, credit card number, and expiration date, and may load the information into desired locations on the interface. This may limit the amount to which a user has to type on the tablet device, saving time.

In still another exemplary embodiment, a tablet associated with each kiosk may have a variety of capabilities. For example, the tablet may utilize software that prevents undesired or unauthorized use of the tablet by changing the software associated with the any physical buttons on the tablet. For example, a home button or a power button may be retasked to direct a user to a help screen, a home screen for the goods or services being offered, or any other desired screen. However, the buttons would prevent a user from accessing any other programs or software applications on the tablet or from manually deactivating or powering-off the tablet. According to an exemplary embodiment, a tablet associated with a kiosk may have key input software, for example soft keyboard software that can be used to display an on-screen image map including a variety of letters or keys. Soft keyboard software running on the tablet may be limited, for example to improve usability or improve device security; for example, soft keyboard software may be custom for each form or form field that a user is to fill out on the tablet associated with the kiosk. For example, according to an exemplary embodiment, when a user selects a field of a form requesting a zip code, a soft keyboard displaying only the numbers 0 through 9 (as well as editing keys such as backspace keys) may be displayed. According to an exemplary embodiment, keys may not be restricted to individual letters; for example, when a user is asked to enter an email address, keys corresponding to common email suffixes, such as ".com" or ".net," or even keys corresponding to common email providers may be provided.

In further exemplary embodiments, as the tablet associated with the kiosk may be connected to the Internet or a network in any desired wired or wireless fashion, the tablet may be remotely controlled. For example, according to an exemplary embodiment, each tablet may be able to be locked, rebooted, shut down, reprogrammed or otherwise manipulated as desired from a remote location or any remote location via a data connection. Each tablet may have a secure ID associated with it that, along with the location tracking described above, can allow for pinpoint location of the tablet and any desired loading or manipulation of data or software based on the location or desired use.

According to an exemplary embodiment, an existing third-party service such as GOOGLE CLOUD MESSAGING may be used for diagnostic and remote control of the device. This may allow push notifications, deep-linking commands, and application data, or other data, as desired, to be sent to the device, for example from a developer's application server.

Further, the tablet associated with the kiosk may have a variety of monitoring capabilities which may be remote or local, as desired. A tablet may send an automated or requested "health" report at any predetermined times or intervals, or in response to a request. This can include details associated with hard drive space available, running programs, software versions for the operating system or other software running on the device, battery status, battery charging levels, battery charging method, power source information, current location using GPS, current location using another method (such as approximate physical address), WiFi information, or cell tower information. Such geographic information can be encoded, transmitted, and/or decoded as street address information or latitude and longitude coordinates, as desired. Data may be transmitted in any desired fashion, including email. Further, such location information can be compared to service area information, for example Lifeline service information areas to determine desired locations for kiosks, to ensure kiosks are in appropriate areas, or to remove kiosks from areas where such service may not be available.

According to an exemplary embodiment, the tablet may use a custom operating system specialized for the tablet devices. Custom operating system may be based off of an existing operating system or may be independently developed, as desired. According to an exemplary embodiment, use of a custom operating system may allow for unnecessary features to be stripped out, which may improve the efficiency of the tablets, and may limit the ability of tablets associated with kiosks to perform other tasks, reducing the desirability of theft. For example, according to an exemplary embodiment, a tablet may be locked down so as to only be able to use a single app running kiosk software. According to another exemplary embodiment, custom operating system may limit what updates can be passed to it; for example, according to an exemplary embodiment, custom operating system may be limited to being updated by a developer of the kiosk software, improving security. Custom operating system may also be configured to have other advantages, as desired.

According to still another exemplary embodiment, custom operating system may require a code, such as a kiosk ID number, to be loaded into the tablet associated with the kiosk in order for it to operate. For example, according to such an embodiment, a kiosk may have a unique kiosk ID number tied to the serial number of the tablet, and the custom operating system may require this unique ID to be loaded onto the kiosk before it will operate; this may prevent the software from running other than on a tablet associated with a kiosk, and may limit the number of instances of the software to one per kiosk ID number. According to an exemplary embodiment, if a tablet associated with a kiosk is reset or enters a recovery mode, restoring the functionality of the tablet associated with the kiosk may require entering in the kiosk ID.

Additionally, each table may have an automatic error reporting service. For example, each device can post error details in the event of crashes or exceptions using SSL and email. Additionally, in the event that a tablet operating off of WiFi loses its connection, it may automatically switch to cellular data transmission and send an appropriate error report or otherwise suspend service until a WiFi connection is reestablished. If a tablet loses its connection to all available network connections, including, for example, WiFi and cellular data transmission, the tablet may perform other error troubleshooting behavior, for example resetting each of the available network connections, as desired. According to an exemplary embodiment, if a tablet loses its connection to all available network connections and cannot establish a new connection by troubleshooting, the tablet may partially or fully restart, as desired.

Additionally, in some further exemplary embodiments, a tablet associated with a kiosk may automatically check for any available updates. According to still other exemplary embodiments, updates may be pushed to a tablet associated with a kiosk without the tablet checking for any available updates. Additionally, updates may be managed upstream at a server or at a tablet, so that updates may be rolled out to one or more tablets in a specific location, for example based on a state, mileage radius or other desired qualifications. This may be accomplished by, for example, limiting the tablets that can download the update to those currently in the specific location, or may be accomplished by pushing the update or permission to update to the tablets expected to be in the specific location, or otherwise accomplished as desired. According to another exemplary embodiment, updates may be managed according to unique kiosk IDs associated with each kiosk and/or tablet, and updates may be rolled out to one or more tablets having a specific kiosk ID or which are within a particular kiosk ID range, or as desired. Such update capabilities may allow for updates to be made in a managed fashion, for example in small bulks, and may allow for reversion of updates in the event of an error, bugs, or other problems, as desired. It may be appreciated that any updates may also be rolled out in bulk, as desired.

In still further exemplary embodiments, information entered on a tablet may be organized and stored with any other desired information obtained from any other tablets. It may be appreciated that any number of tablets may be networked together or may be in communication with one or more servers that are networked or otherwise in communication with each other. Information about any transaction can be recorded and compared, as desired. Such information may be for general statistical purposes or for marketing purposes. For example, software on any tablet can record how much time each applicant spent using the kiosk, entering in information, or the like. Additional information can be obtained in any of a variety of fashions and for any other desired purpose.

Figure 4:
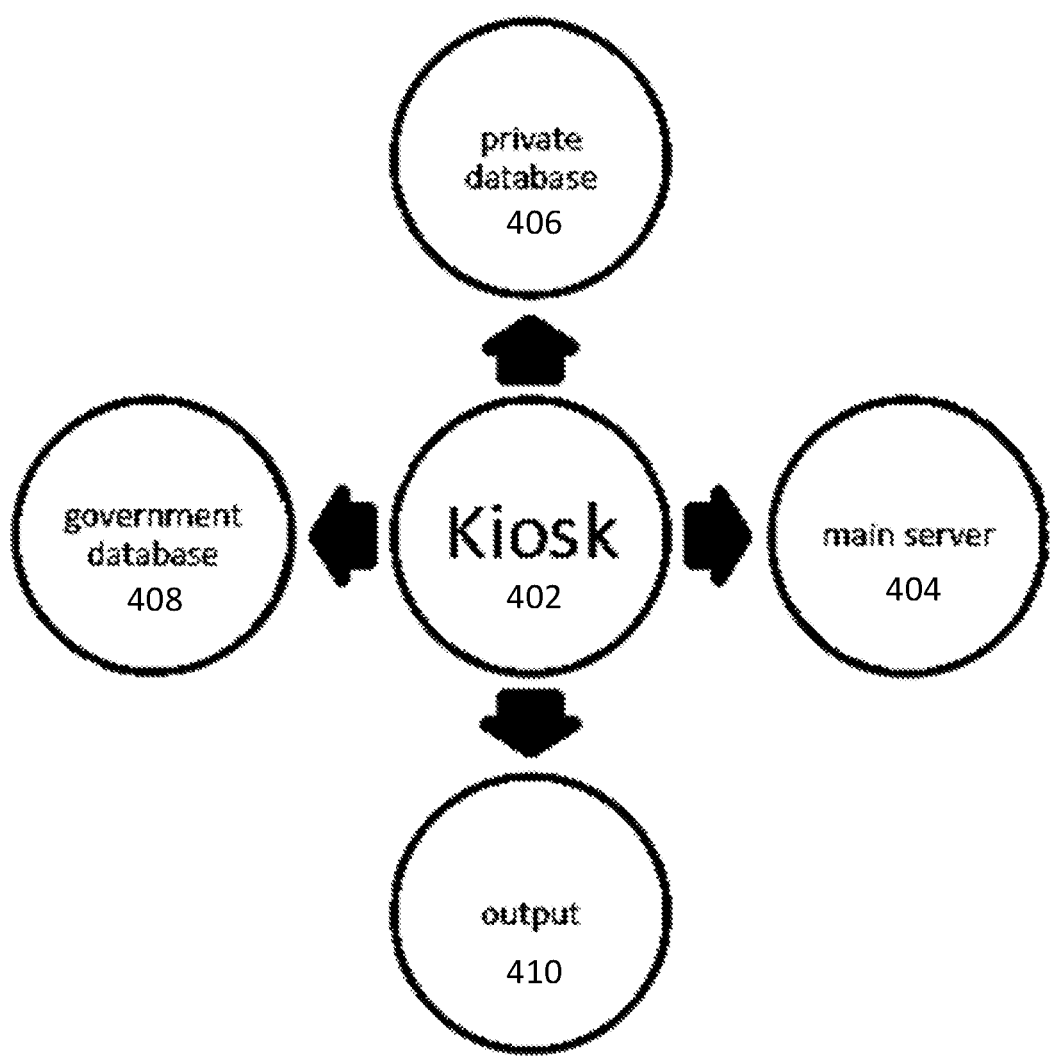
FIG. 4 is an exemplary diagram showing an embodiment of a system for receiving, transmitting, securing, and verifying data.

Turning now to exemplary FIG. 4, FIG. 4 is an exemplary diagram showing an alternative embodiment of a system for receiving, transmitting, securing, and verifying data 400. According to an exemplary embodiment, a kiosk 402 may simultaneously access a plurality of remotely located servers, which may for example include at least one main server 404, at least one private database 406, and at least one government database 408. According to an exemplary embodiment, a user may input user information, which may be shared with a main server 404 and displayed on a display associated with a main server 404. Display may be in real time, or after a submission or other form of completion of information entry, as desired. Once information has been entered, it may be transferred to a second-party server, which may be, for example, a government database 408 and/or a private database 406, which may house or otherwise be securely associated with information verification data.

Upon completion of the verification of the information, the second-party server 406, 408 may immediately transmit a response to both the kiosk 402 and the main server 404. The response may indicate that the information was properly verified or that the information could not be or is not verified. When a message is received at the main server 404 and the kiosk 402 that the information is verified, a message may be sent from one or both of the kiosk 402 and the main server 404 to any remaining servers 406, 408 which have not yet returned a verification message or response, indicating that no verification message or response is necessary, if desired. In other cases, multiple verifications or even unanimous verification may be desired.

Once verification has been obtained by the kiosk 402, it may output a response 410 to the user. Output may include, for example, an output on a display, on a printer, or another form of output, as desired.

Figure 5:
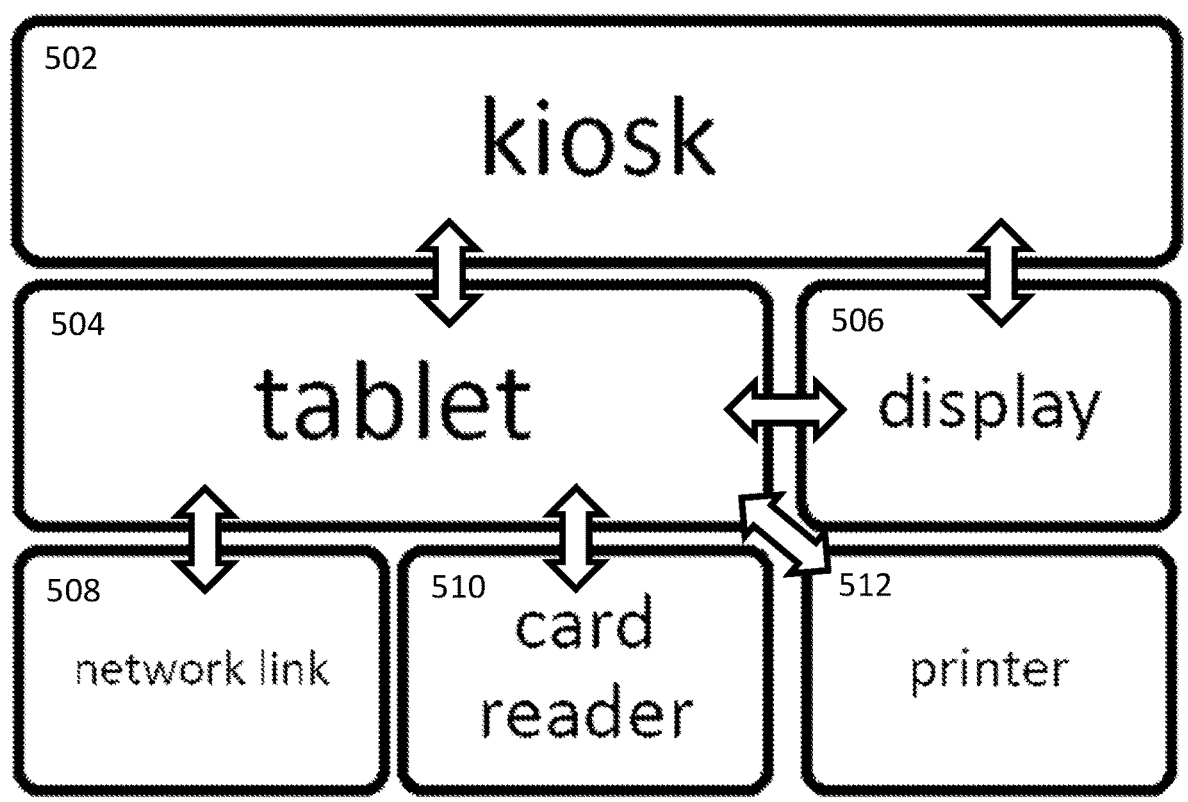
FIG. 5 is an exemplary diagram showing an embodiment of a system for receiving, transmitting, securing, and verifying data.

Turning now to exemplary FIG. 5, FIG. 5 is an exemplary diagram showing an alternative exemplary embodiment of a system for receiving, transmitting, securing, and verifying data 500. A kiosk 502 may include a tablet 504 and a display 506, which may be embodied on the tablet 504, as desired. Tablet 504 may be connected to a network link 508, a card reader 510, and/or a printer 512; optionally, any or all of these devices may be connected in an alternative configuration, as desired. It may be appreciated that the physical structure of the kiosk 502 may have one or more anchoring mechanisms to secure the kiosk 502 in any location where it may be deployed. It is further understood that the kiosk 502 may be formed so as to be substantially weatherproof and tamperproof so that it may be deployed in any interior or exterior environment.

Card reader 510 may be, for example, a magnetic stripe reader. In another exemplary embodiment, card reader may make use of optical character recognition to capture and automatically input data from a card. Card reader 510 may also be equipped to capture other information, such as the image of the face of the user presenting the card, as desired.

Display 506 and/or printer 512 may be used to output any desired data. For example, a printer 512 may be configured to provide a printout of any desired information following a transaction on the kiosk 502. This can include, for example, a session ID number, an authorization code, proof of submitted data, follow-up contact information, reasons for refusal of goods or services, and the like.

Figure 6:
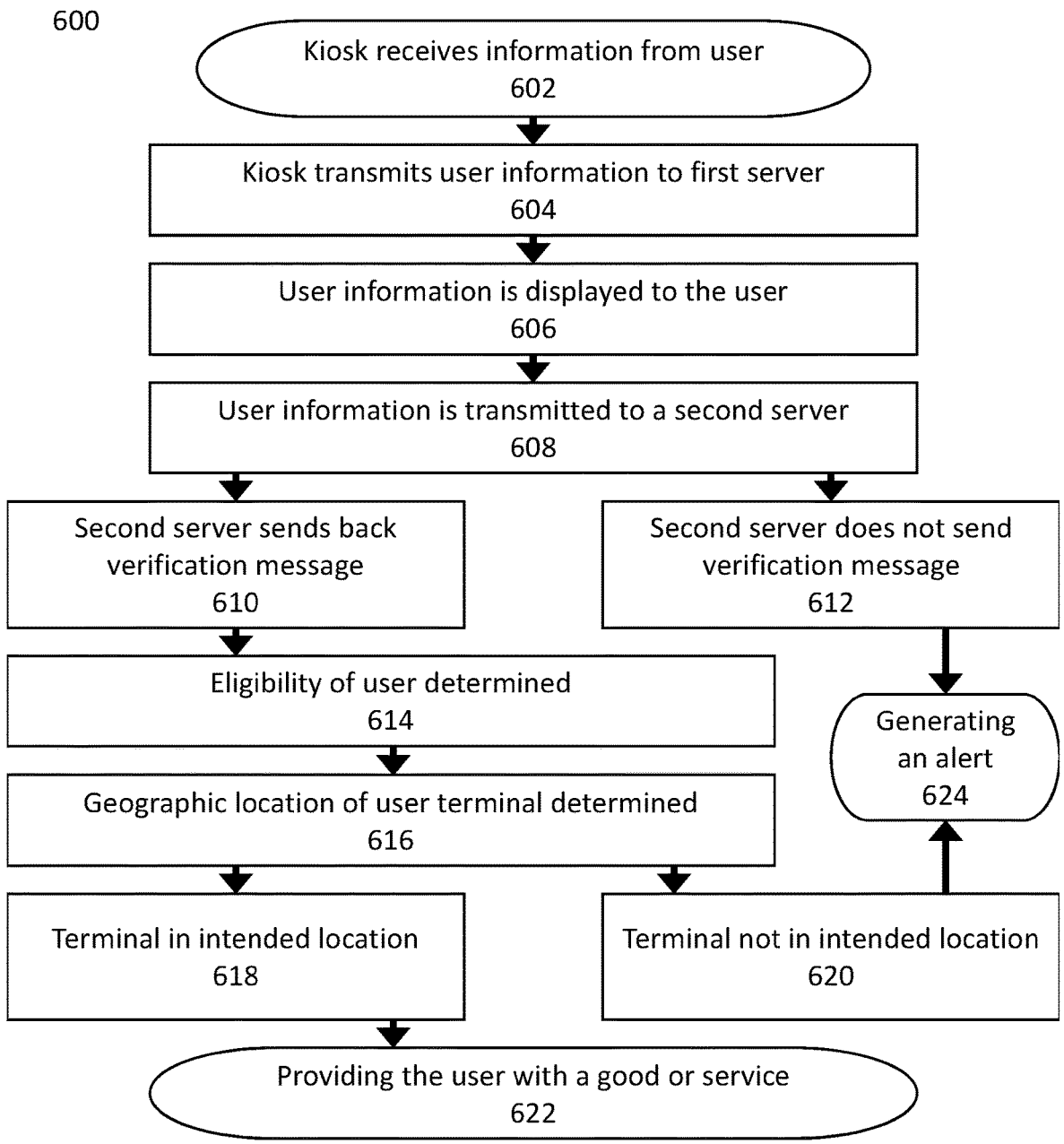
FIG. 6 is an exemplary diagram of a logic tree used in a kiosk.

Turning now to exemplary FIG. 6, FIG. 6 shows an exemplary embodiment of a logic tree that may depict the functionality of a kiosk. A kiosk may first receive information from a user 602. The kiosk may then transmit the user information to a first server 604. This user information may also be displayed to the user 606, for example on a user terminal in the kiosk. According to an exemplary embodiment, this information may be provided by the server, while according to another exemplary embodiment this information may be provided by the kiosk.

User information, such as a user's name or user's address or location, may also be transmitted to a second server 608. Second server may be connected to a database, such as a private database or government database. The server may then send back a verification message, for example to the first server or to the kiosk 610, or may not send back a verification message 612, based on whether the user information can be verified by the server. According to an exemplary embodiment, a server that cannot verify the user information and which does not send back a verification message 612 may send back no message. According to another exemplary embodiment, a server that cannot verify the user information and which does not send back a verification message 612 may send back a message indicating that the user could not be verified. According to another exemplary embodiment, a server may do both for different users; for example, a server may send back no message when a user does not appear in the system, but may send back a message indicating that the user could not be verified when the user information provided by a user does refer to a person in the system, but wherein different data is associated with the person in the system than that provided by the user. This may alert an administrator monitoring the terminal to possible fraud, or may otherwise be used to improve security, as desired.

According to an exemplary embodiment, the eligibility of a user for a good or service 614 may then be determined, for example by a kiosk or server. If a user is not eligible for a particular good or service, they may be told this at this stage and the process may end. However, if the user is eligible for a particular good or service, for example if the user is eligible to enroll in the government program that would provide the good or service, the process may continue.

The kiosk may also verify its geographic location 616. This may, for example, be used to ensure that the kiosk has not been stolen or hacked, which may limit fraud and theft. If the kiosk is in its proper geographic location 618, or within a certain area of its proper geographic location, the process may continue, and the user may be provided with a good or service 622. Alternatively, the user may be provided with the right to claim a good or service; for example, the kiosk may print a claim slip or claim code for the user. If the kiosk is not in its proper geographic location 620, the process may terminate and an alert may be generated.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A deployable kiosk comprising a display, a card reader, a printer, a tablet having a processor, a user terminal, and a network link, the deployable kiosk operable to:
   receive user information comprising at least the name of a user and a location of the user;
   transmit the user information to a first server;
   display, on a graphical user interface of the user terminal, the user information;
   transmit the user information from the first server to at least one second server, the at least one second server being a database server storing identity verification data, and wherein the at least one second server has a value associated with an estimated reliability of the second server;

receive a verification message from the at least one second server, the verification message comprising a verification of an authenticity of the user information of the user;

determine geographic eligibility of the user to be provided a geographically-limited good or service;

determine location data of the user terminal;

determine, from the location data of the user terminal, whether the user terminal is within an eligible area to be provided the geographically-limited good or service, and whether the user terminal is in its intended location by comparing the intended location to the location data of the user terminal;

generate an alert, displaying, on the graphical user interface, the alert to the user, and transmit the alert to the first server when the user terminal is not in the intended location; and when the user is geographically eligible to be provided the geographically-limited good or service, and when the user terminal is within the eligible area to be provided the geographically-limited good or service and in the intended location, providing the user with the geographically-limited good or service.

2. The deployable kiosk of claim 1, wherein the deployable kiosk is further operable to detect motion within a range of the motion detector.

3. The deployable kiosk of claim 2, wherein when motion is detected, the user terminal switches from a power conservation state to an active state.

4. The deployable kiosk of claim 2, wherein the deployable kiosk is further operable to display a first item of visual media on the graphical user interface of the user terminal, the first item of visual media comprising at least one of a static advertisement or a video; and when motion is detected, display a second item of visual media on the graphical user interface of the user terminal.

5. The deployable kiosk of claim 2, wherein the deployable kiosk is further operable to: when motion is detected, playing, with a speaker of the user terminal, audio data.

6. The deployable kiosk of claim 1, wherein the deployable kiosk is further operable to: record a document of the user; store an image of the document of the user; perform optical character recognition on the document of the user; and display, on the graphical user interface of the user terminal, information derived from the optical character recognition of the document of the user.

7. The deployable kiosk of claim 6, wherein the deployable kiosk is further operable to record a document signature of the user; receive, on the graphical user interface of the user terminal, a new signature of the user; and compare the document signature and the new signature to authenticate the user.

8. The deployable kiosk of claim 1, wherein the deployable kiosk is further operable to: record, with the card reader of the user terminal, credit card information of the user; transmit the credit card information of the user from the card reader of the user terminal to a processor of the user terminal; and display on the graphical user interface of the user terminal, the credit card information of the user.

9. The deployable kiosk of claim 8, wherein the user terminal comprises the tablet having an audio port, the card reader of the user terminal comprises a peripheral device connected to the tablet, and the credit card information of the user is transmitted from the card reader of the user terminal to the processor of the user terminal via an audio port connection.

10. The deployable kiosk of claim 1, wherein the at least one second server comprises a plurality of database servers, and wherein the user information is transmitted simultaneously to each of the plurality of database servers.

11. The deployable kiosk of claim 1, wherein the at least one second server comprises at least a public database server and a private database server.

12. The deployable kiosk of claim 11, wherein a verification message from a public database server has a first weight and a verification message from a private database server has a second weight different from the first weight.

13. The deployable kiosk of claim 1, wherein data is transmitted to the at least one second server by the use of a server API.

14. A computer program product embodied on a non-transitory computer readable medium, comprising code executable by a computer comprising a processor, a user terminal, and a memory, to cause the computer to carry out the following steps:

receiving, with a processor, from the user terminal, user information comprising at least the name of a user and a location of the user;

transmitting the user information to a first server;

displaying, on a graphical user interface of the user terminal, the user information;

transmitting the user information from the first server to at least one second server, the at least one second server being a database server storing identity verification data;

receiving a verification message from the at least one second server, the verification message comprising a verification of an authenticity of the user information of the user based on a value associated with an estimated reliability of the at least one second server;

determining, with the processor, geographic eligibility of the user to be provided a geographically-limited good or service;

determining, with the processor, location data of the user terminal;

determining, with the processor, from the location data of the user terminal, whether the user terminal is within an eligible area to be provided the geographically-limited good or service, and whether the user terminal is in its intended location by comparing the intended location to the location data of the user terminal;

when the user terminal is not in the intended location, generating, with the processor, an alert, displaying, on the graphical user interface, the alert to the user, and transmitting, with processor, the alert to the first server; and when the user is geographically eligible to be provided the geographically-limited good or service, and when the user terminal is within the eligible area to be provided the geographically-limited good or service and in the intended location, providing the user with the geographically-limited good or service.

15. The computer program product of claim 14, further comprising code executable to cause the computer to carry out the following steps:

detecting, with a motion detector of the user terminal, motion within a range of the motion detector.

16. The computer program product of claim 14, further comprising code executable to cause the computer to carry out the following steps:

recording, with a camera, a document of the user;
storing, on the memory, an image of the document of the user;
performing, with the processor, optical character recognition on the document of the user; and
displaying, with the processor, on the graphical user interface of the user terminal, information derived from the optical character recognition of the document of the user.

17. The computer program product of claim 14, further comprising code executable to cause the computer to carry out the following steps:
recording, with a card reader of the user terminal, credit card information of the user;
transmitting the credit card information of the user from the card reader of the user terminal to the processor of the user terminal; and
displaying, with the processor, on the graphical user interface of the user terminal, the credit card information of the user.

18. The computer program product of claim 17, wherein the user terminal comprises a tablet computer having an audio port; wherein the card reader of the user terminal comprises a peripheral device connected to the tablet computer; and wherein the credit card information of the user is transmitted from the card reader of the user terminal to the processor of the user terminal via an audio port connection.

19. The computer program product of claim 14, wherein the at least one second server comprises a plurality of database servers including at least a public database server and a private database server;
wherein the user information is transmitted simultaneously to each of the plurality of database servers; and
wherein receiving a verification message from the public database server causes a message to be transmitted to the remaining plurality of database servers indicating that it is no longer necessary for the remaining plurality of database servers to send a response.

20. A system comprising at least one processor, at least one memory module, and at least one user terminal having a graphical user interface, the at least one memory module and the computer program code configured to, with the processor, cause the system to at least:
receive, with the processor, at the user terminal, user information comprising at least the name of a user and a location of the user;
transmit the user information to a first server;
display, on the graphical user interface, the user information; transmit the user information from the first server to at least one second server, the at least one second server being a database server storing identity verification data with a corresponding value associated with the estimated reliability of the at least one second server;
receive a verification message from the at least one second server, the verification message comprising a verification of an authenticity of the user information of the user;
determine, with the processor, geographic eligibility of the user to be provided a geographically-limited good or service;
determine, with the processor, location data of the user terminal;
determine, with the processor, from the location data of the user terminal, whether the user terminal is within an eligible area to be provided the geographically-limited good or service, and whether the user terminal is in its intended location by comparing the intended location to the location data of the user terminal;
when the user terminal is not in the intended location, generate, with the processor, an alert, display, on the graphical user interface, the alert to the user, and transmit, with the processor, the alert to the first server; and when the user is geographically eligible to be provided the geographically-limited good or service, and when the user terminal is within the eligible area to be provided the geographically-limited good or service and in the intended location, provide the user with the geographically-limited good or service.

* * * * *